United States Patent [19]

Lisfeld et al.

[11] 4,372,650
[45] Feb. 8, 1983

[54] MOUNTING FOR MICROSCOPE LENS

[75] Inventors: Robert Lisfeld, Greifenstein-ulm; Reinhold Bender, Solms, both of Fed. Rep. of Germany

[73] Assignee: Ernst Leitz Wetzlar GmbH, Wetzlar, Fed. Rep. of Germany

[21] Appl. No.: 207,970

[22] PCT Filed: Jan. 12, 1980

[86] PCT No.: PCT/DE80/00004
§ 371 Date: Sep. 19, 1980
§ 102(e) Date: Sep. 18, 1980

[87] PCT Pub. No.: WO80/01512
PCT Pub. Date: Jul. 24, 1980

[30] Foreign Application Priority Data

Jan. 19, 1979 [DE] Fed. Rep. of Germany ... 7901401[U]

[51] Int. Cl.³ .................. G02B 7/02; F16L 39/00
[52] U.S. Cl. .................... 350/252; 285/276; 285/277; 285/317; 350/254
[58] Field of Search ........... 350/252, 254, 257, 38–39; 354/286; 285/276–277, 317, 319, 321; 403/328, 377, DIG. 4, DIG. 6, DIG. 8

[56] References Cited
U.S. PATENT DOCUMENTS 2,075,483  3/1937  Trotter .................. 403/328
3,347,575  10/1967  Morris .................. 285/319
4,111,530  9/1978  Fuehrer et al. .......... 350/252

FOREIGN PATENT DOCUMENTS 813687   7/1951  Fed. Rep. of Germany ...... 285/319
1993231  9/1968  Fed. Rep. of Germany .
2554749  6/1977  Fed. Rep. of Germany .
8286     of 1894  United Kingdom ........... 285/319
917193   1/1963  United Kingdom .

OTHER PUBLICATIONS

Leitz, E., Abstract of German Utility Model #1993231, 9/5/68.
Hildebrand "Feinmechanische Bauelemente", Carl Hansen Verlag, Munich (1978), p. 592.

Primary Examiner—William H. Punter
Attorney, Agent, or Firm—Schwartz, Jeffery, Schwaab, Mack, Blumenthal & Koch

[57] ABSTRACT

A microscope objective mount is described for screwing onto a microscope, said microscope having a tube which is rotatable around the mount and is held onto the mount. The mount is distinguished in that the tube extends over approximately the entire length of the mount, with the tube and mount being releasably connected together by a catch connection.

5 Claims, 3 Drawing Figures

MOUNTING FOR MICROSCOPE LENS

The invention concerns a microscope objective mount for screwing into a microscope, said microscope having a tube which rotates around the mount and is held onto the mount.

Tubes for surrounding microscope objective mounts are known, which tubes bear data on them concerning, for example, the mechanical tube length, the optimal cover glass thickness, the magnification, and the numerical aperture. Under this arrangement, with the objective screwed in it is possible at any time to rotate these inscriptions into the user's field of vision, which is particularly advantageous when there is an objective turret.

German Gebrauchsmuster No. 19 93 231 describes a device which has, in addition to a mount and a tube, ring grooves into which a spring ring fits to hold the tube, or else the tube is held in place by a screwed on cap. In this way, the objective can be screwed on or off at any time along with the attached tube.

Another approach to rotatably attaching the inscribed tube to the objective mount comprises, according to German Pat. No. 2,554,749, an elastically deformable ring provided between the tube and the mount, whereby the tube and the ring have raised areas and depressions, and the mount has a ring groove. When the tube is slid up, a force-locking connection with the ring is produced; at the same time, easy rotatability of the tube is ensured, so that unwanted loosening of the microscope objective does not occur merely by rotating the tube. Also with this arrangement the objective can be removed along with the attached tube without special auxiliary means. Particularly with classroom microscopes this presents a certain hazard, in that beginners may often inexpertly screw the objective in and out, and the objective may even be stolen.

Accordingly, the problem underlying the invention is to devise a microscope objective mount of the type initially described supra such that the microscope objective cannot be removed by an unauthorized person (for example), while nontheless the tube is rotatable without special auxiliary means.

This problem is solved according to the invention by having the tube extend approximately over the entire length of the mount, with the tube and the mount being releasably connected by a catch. In this way the rotatability of the tube is maintained, so that the data on it can be made visable. At the same time, it is ensured that the mount cannot be taken hold of and the objective screwed out, since the mount is practically completely surrounded by the rotatable tube, and the catch rotates with the tube around the mount. A tool for opening the catch is needed to release the tube from the mount. The objective cannot be screwed on or off with the tube attached.

A suitable catch connection comprises a curved (by bending), radially deformable leaf spring with a projection attached to or built into it, and with a corresponding drill hole in the tube for the purpose of accommodating said projection, whereby the leaf spring is rotatable together with the tube in a ring groove of the mount. Additional components are not needed. However, obviously other kinds of catch connections may be used, such as spring-loaded spheres, threaded sleeves, or the like. Finally, it is particularly advantageous for the catch connection to be disposed close to the screw thread for screwing on the objective. In this way the only externally identifiable part of the catch connection, namely, the drill hole in the tube, with the projection of the leaf spring pushed into said hole, is in practice covered by the objective tube or turret.

Figure 1:
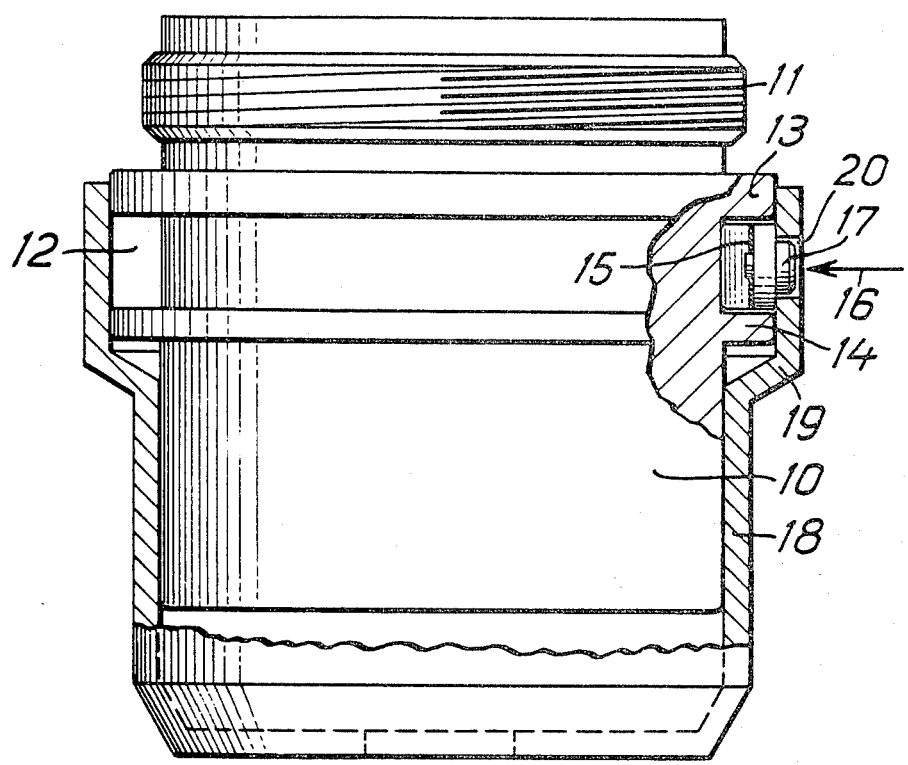
FIG. 1 is a partially cutaway elevational view of a microscope objective mount illustrating one preferred embodiment of the invention.

The drawings show two schematic cross-sections of embodiments of microscope objective mounts according to the invention, and are described in some detail infra.

DETAILED DESCRIPTION OF PREFERRED EMBODIMENTS

The microscope objective mount 10 is provided on its upper end with a screwing-on thread 11 for screwing it onto an objective tube or turret (not shown). Closely underneath thread 11 is ring-shaped groove 12, bounded by an upper flange 13 and a lower flange 14 built onto or attached to mount 10 and extending radially. Due to the generally thin walls of microscope objective mounts, groove 12 between flanges 13 and 14 is only deep enough to accommodate at least partially a curved leaf spring 15, which spring braces itself against flanges 13 and 14 in the axial direction. The curvature of leaf spring 15 is chosen such that in the rest state it lies against the cylindrical surface of ring-shaped groove 12 and is overhung by flanges 13 and 14 only in the area of its two ends, while the middle segment of the spring projects slightly beyond the flanges. This results in radial elastic deformability of leaf spring 15 in the direction shown by arrow 16. On the side of leaf spring 15 which is turned away from groove 12 there is a projection 17 formed on the spring approximately in its middle.

Mount 10 is surrounded approximately over its entire length by an essentially cylindrical tube 18, the inner surface of which lies rotatably on the outer surface of mount 10. On its end which first slides over mount 10, tube 18 has a collar-shaped broadened region 19 to facilitate sliding on the tube 18. Near the upper edge of broadened region 19 a drill hole 20 is provided in tube 18, with a diameter slightly greater than that of projection 17 on leaf spring 15, to receive the projection.

Figure 3:
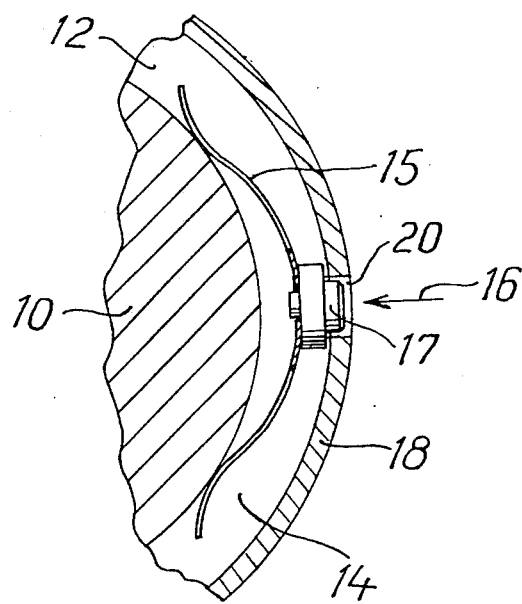
FIG. 3 is a transverse sectional detail view of the cutaway portion of the embodiment of FIG. 1.

FIG. 3 is a transverse sectional detail view of the cutaway portion of FIG. 1 showing the concave curvature of leaf spring 15 in relation to the optical axis of the objective. In the rest state or unstressed condition, spring 15 has a radius of curvature which is less than the radius of curvature of the ring-shaped or annular groove 12.

Accordingly, there results the following operation of the device: To attach the microscope objective to an objective tube or turret, the mount 10 with its screwing-on thread 11 is screwed into the counterpart thread (not shown). It is advantageous if before this screwing-in the leaf spring 15 is inserted in the ring-shaped groove 12 of mount 10, where the spring is held by flanges 13 and 14. However, it is also possible to insert leaf spring 15 into groove 12 after screwing-in mount 10. Tube 18 is then slid over mount 10 which has been screwed in; in the process, drill hole 20 in tube 18 is approximately lined up with projection 17 on leaf spring 15. The pushing-on of tube 18 is first limited by leaf spring 15, which has its middle part bearing projection 17 extending out beyond flanges 13 and 14, against which broadened region 19 of tube 18 comes to a stop. Light pressure on leaf spring 15 deforms it radially inwardly and it rests snugly against ring-shaped groove 12. Tube 18 with its broadened region 19 is then slid over leaf spring 15, whereby, at the moment when hole 20 in tube 18 slides over projection 17 of leaf spring 15, the spring is de-stressed and engages its projection 17 in hole 20, providing an axial catch connection between tube 18 and mount 10. When the tube 18 is rotated around mount 10, which is fixed, leaf spring 15 is correspondingly carried along in ring-shaped groove 12, whereby tube 18 is held by projection 17 which engages hole 20 in tube 18, and is secured against radial and axial movement.

Figure 2:
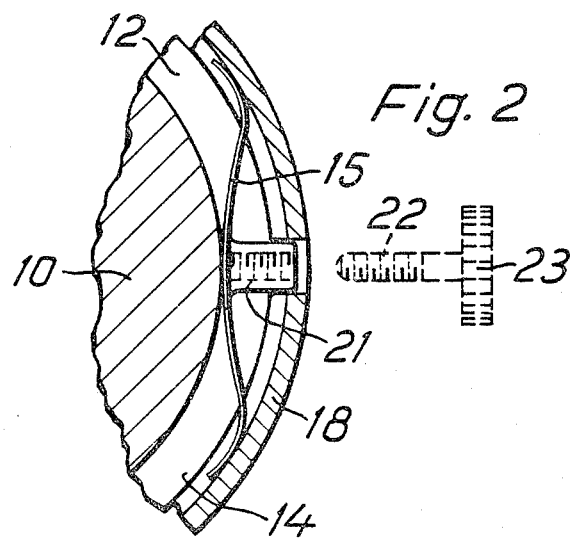
FIG. 2 is a transverse sectional detail view corresponding to the cutaway portion of FIG. 1 illustrating an alternate embodiment of the invention.

In the embodiment of FIG. 2, the leaf spring 15 is convexly curved in relation to the optical axis of the objective. Accordingly, its middle region engages the ring-shaped groove 12 of mount 10 and lies against the base of the channel. A threaded socket 21 is attached to or made a part of the middle region of leaf spring 15, into which a threaded pin 22 with a knurled knob 23 on it (shown here in dashed lines) is screwable.

Since tube 18 extends nearly over the entire length of mount 10, there is no extending part available with which to grab the mount and screw it out. It is especially advantageous that a surface finishing of the mount may be dispensed with.

The catch must be released in order to remove the objective. In the first instance, this is accomplished easily by pressing a sharp object against projection 17 of sheet spring 15. Projection 17 thereby is moved back into ring-shaped groove 12, releasing the catch, so that tube 18 can be pulled off of mount 10 and the latter can be screwed off.

In the second instance, to release the catch the threaded pin 22 is screwed into threaded socket 21 and pulled lightly in the radial direction, which is facilitated by knurled knob 23. This lifts the middle region of leaf spring 15 from the base of ring-shaped groove 12, so that tube 18 can be pulled off over the lower flange 14 of groove 12. With this embodiment, the removal of tube 18 from mount 10 and thereby the removal of the objective from the objective tube or turret is particularly difficult.

What is claimed is:

1. A microscope objective mount comprising:
   a mount body with thread means for screwing said mount onto a microscope, said mount body having an annular groove therearound;
   a tubular sleeve surrounding said mount body and covering substantially the entire length of said mount body when said mount body is screwed onto a microscope, said sleeve having a hole therethrough; and
   detent means engaging said groove on said mount body and said hole through said sleeve for releasably and rotatably securing said sleeve on said mount body, said detent means being releasable only with the aid of an opening tool through said hole;
   whereby said sleeve is freely rotatable around said mount body and cannot be removed from said mount body without an opening tool, and said mount cannot be unscrewed from said microscope with said sleeve thereon.

2. A microscope objective mount according to claim 1, wherein said detent means comprises a curved, radially deformable leaf spring engaging said groove on said mount body and having a projection which matingly engages said hole through said sleeve.

3. A microscope objective mount according to claim 1, wherein said annular groove is disposed adjacent said thread means on said mount body.

4. A microscope objective mount according to claim 2, wherein said leaf spring is concavely curved in relation to the optical axis of said objective and in the rest state has a radius of curvature which is less than the radius of curvature of the annular groove of said mount body.

5. A microscope objective mount according to claim 2, wherein said leaf spring is convexly curved in relation to the optical axis of said objective; the central portion of said leaf spring engages the annular groove of said mount body, and said projection comprises a threaded socket attached to the central portion of said leaf spring.

* * * * *